Oct. 13, 1936.    E. B. SLEETER ET AL    2,057,214
ALTERNATING CURRENT MOTOR
Filed Aug. 27, 1932    2 Sheets-Sheet 1
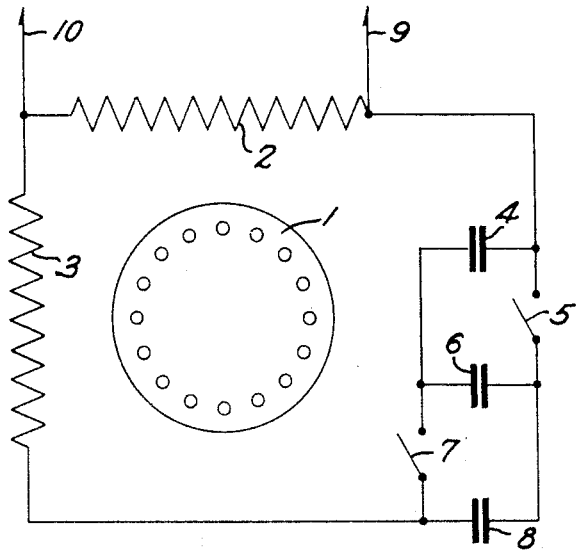
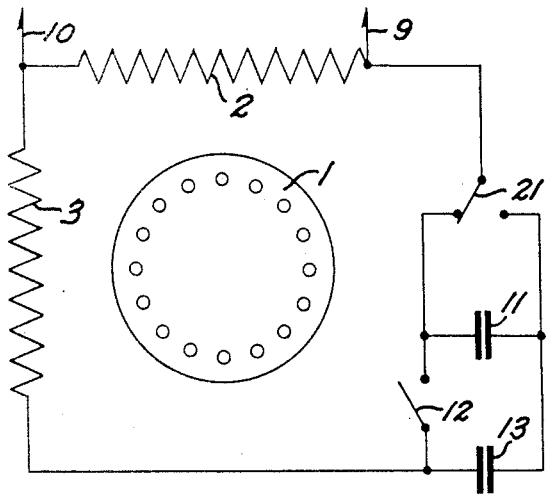
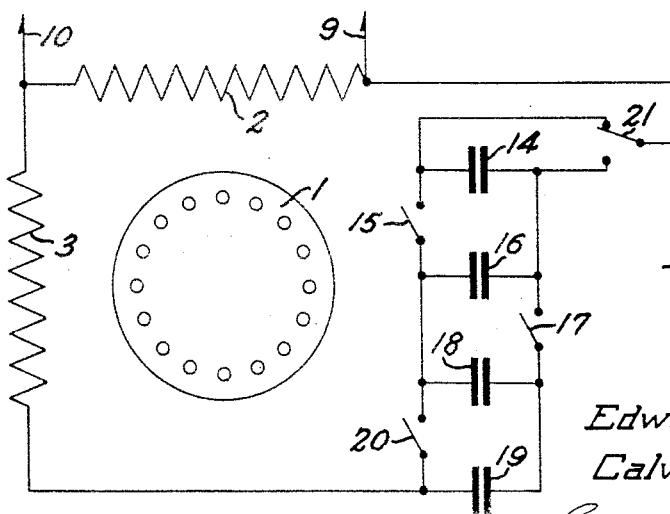
Inventor
Edward B. Sleeter
Calvin J. Werner
By Spencer Hardman & Fehr
Their Attorneys

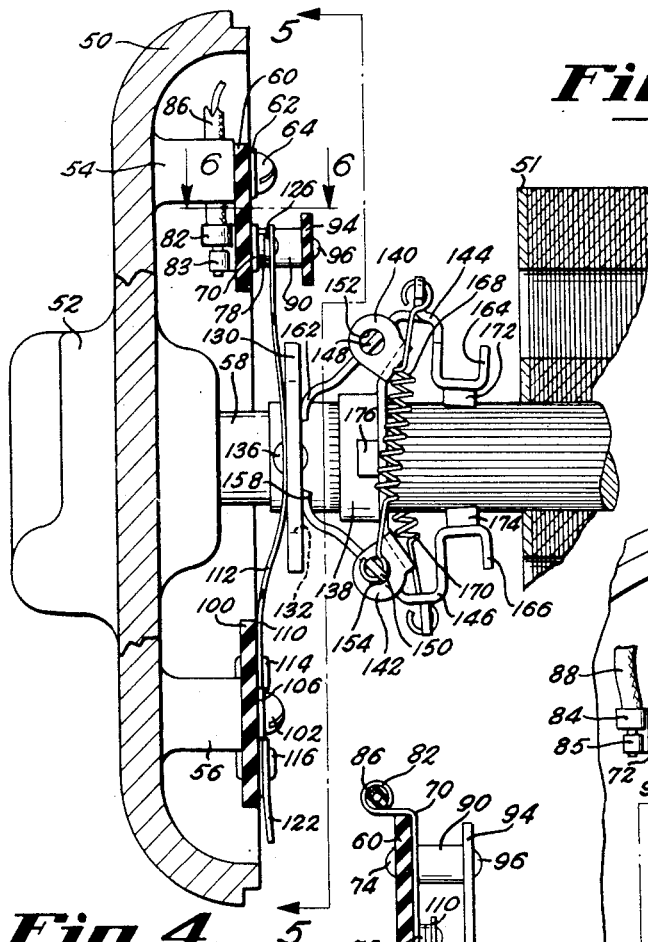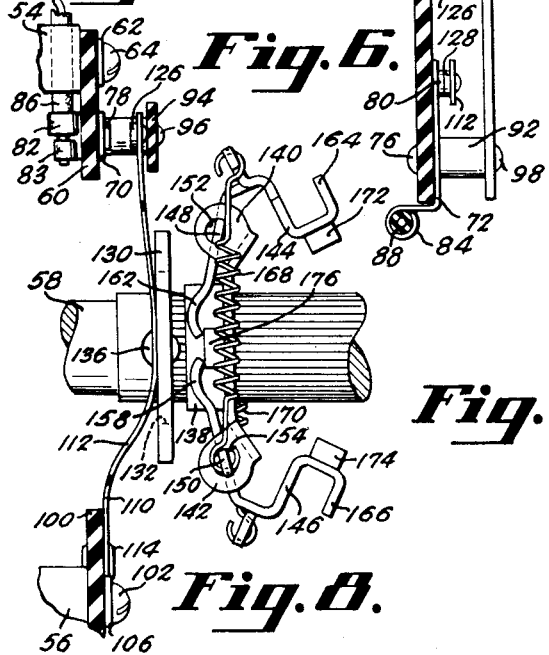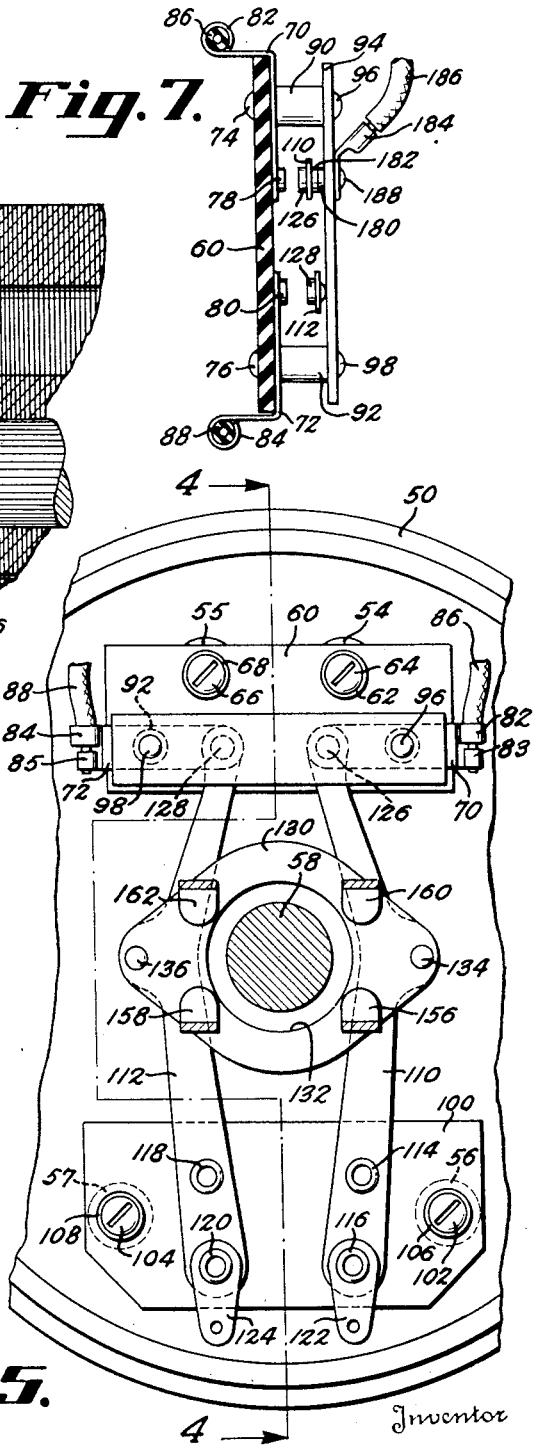

Patented Oct. 13, 1936

2,057,214

UNITED STATES PATENT OFFICE 2,057,214

ALTERNATING CURRENT MOTOR

Edward B. Sleeter and Calvin J. Werner, Dayton, Ohio, assignors, by mesne assignments, to General Motors Corporation, Detroit, Mich., a corporation of Delaware Application August 27, 1932, Serial No. 630,626

17 Claims. (Cl. 172—233)

This invention relates to electric motors, and more particularly to a system utilizing condensers or reactances in the starting and operation of alternating current induction motors.

It is well known in the art that condensers have been used in series with one winding of a split phase motor to produce a field that is out of time and space phase with the main field, and through this means produce a resultant rotating field that will cause the rotor of the motor to start rotating. It is also well known that the capacity of the condensers should be changed in order to obtain the best characteristics when the motor has gained speed, because the rotor when running has two currents that are out of phase produced therein due to the transformer and rotational voltages, and a rotating magnetic field is thereby inherently produced.

In previous starting circuits of this nature, however, the condensers have been so connected that a change in a transformer ratio is necessary to effect the proper change in effective capacity, thus necessitating a transformer in the starting circuit, or else condensers have been utilized for starting that are idle and effectively out of the circuit after the motor is running. In the latter case, the condenser or condensers that remain in the circuit must be built to stand continuously the line voltage plus the voltage induced in the winding.

It is therefore an object of this invention to provide a starting circuit for a single phase motor that eliminates the necessity of a transformer for changing the effective value of the capacity in the circuit, and at the same time utilizes the condensers for both starting and running. This object is accomplished by providing a plurality of condensers in the circuit of the starting winding of the motor and switching means for changing the circuit relations of the condensers to effect a change in the effective value of the total condenser capacity in the starting winding circuit.

It is also an object of this invention to provide a means for starting and operating a single phase motor which permits the condensers utilized to be operated at or near their maximum allowable voltage for only a short interval of time while the motor is starting, and then causes the voltage to be reduced to a value providing a substantial safety factor for continuous operation. This object is accomplished by providing a plurality of condensers in the circuit of the starting winding of the single phase motor, which condensers are connected in parallel for a short interval of time during the starting of the motor, and then are switched to a series combination in which series combination the voltage across each of the condensers is reduced to a value providing a substantial safety factor for the continuous operation of the condensers.

Another object of this invention is to provide a system for starting and operating single phase motors which, while having the characteristics expressed above, permits a ratio of change in capacity of the condensers between that for starting and that for running that is proportional to the ratio of running reactance to starting reactance. This object is accomplished by providing a plurality of condensers in the circuit of the starting winding of a single phase motor, the circuit connections of which condensers are so changed by switching means that the condensers are changed from a parallel to a series combination in switching from the starting to the running circuits of the motor, and the number and value of which condensers are so selected that the specified ratio of the running reactance to starting reactance is obtained.

Still another object of this invention is to provide a system for starting and operating single phase motors which while being economical to build, has considerable flexibility of design. This object is accomplished in a system such as that described above, since the number as well as the capacity of the condensers is variable.

Further objects and advantages of the present invention will be apparent from the following description, reference being had to the accompanying drawings wherein a preferred embodiment of one form of the present invention is clearly shown.

In the drawings:

Fig. 1 shows a schematic diagram of a motor circuit involving a preferred form of the present invention.

Figs. 2 and 3 are schematic diagrams of motor circuits, and show modifications of the present invention.

Fig. 4 is a fragmentary sectional side view of one form of switching mechanism usable to automatically accomplish the switching operations for the system disclosed. The switch being shown with the contacts in the closed position.

Fig. 5 is a fragmentary view taken substantially in the direction of the arrows and on the line 5—5 of Fig. 4.

Fig. 6 is a sectional view taken in the direction of the arrows and on the line 6—6 of Fig. 4, and shows in detail the contact arrangement used with the circuit of Fig. 1.

Fig. 7 is a view similar to Fig. 6, and shows a modification in the contact arrangement that is usable with a circuit such as Fig. 2.

Fig. 8 is a fragmentary sectional view of the switch and switch actuating mechanism showing the contacts in the open position.

With particular reference to Fig. 1, a conventional squirrel cage type of motor rotor 1 is magnetically associated with a main field winding 2 and an auxiliary field winding 3. One end of the main field winding 2 is connected to an end of the auxiliary field winding 3. The other end of the main field winding 2 is connected to one side of a condenser 4, and to one terminal of a switch 5. The other side of the condenser 4 is connected to one side of a condenser 6 and to one terminal of a switch 7. The other side of the condenser 6 is connected to the other terminal of the switch 5 and to one side of a condenser 8. The other side of the condenser 8 is connected to the other terminal of the switch 7, and to the end of the auxiliary winding 3 opposite the end of that winding that is connected to the main field winding 2. The E. M. F. or driving force is applied to the motor across the main field winding 2 through the power line leads 9 and 10.

With particular reference to Fig. 2, parts bearing reference numerals similar to those in Fig. 1 are similar, and perform similar functions. However, in this modification, only two condensers are used. One end of the main field winding 2 is connected to the common element of a two way switch 21, and through that switch may be connected to either side of a condenser 11. One side of the condenser 11 is connected to one terminal of a switch 12 and the other side of that condenser is connected to one side of a condenser 13. The other side of the condenser 13 is connected to the other terminal of the switch 12 and to an end of the auxiliary field winding 3.

With particular reference to Fig. 3, parts bearing reference numerals similar to those of Figs. 1 and 2 are similar and perform similar functions. In this modification, four condensers have been shown in the circuit. One end of the main field winding 2 is connected to the common element of a two way switch 21, and through that switch may be connected to either side of a condenser 14. One side of the condenser 14 is connected to one terminal of a switch 15, and the other side of that condenser is connected to one side of a condenser 16 and to one terminal of a switch 17. The other side of the condenser 16 is connected to the other terminal of the switch 15 and to one side of a condenser 18 as well as to one terminal of a switch 20. The other side of the condenser 18 is connected to the other side of the switch 17 and to one side of a condenser 19, while the other side of the condenser 19 is connected to the other side of the switch 20 and to one side of the auxiliary field winding 3.

With reference to Figs 4, 5, 6, and 8, the numeral 50 refers to an end bell of a motor having a bearing housing 52 formed thereon for supporting a shaft 58, and having posts such as 54, 55, 56, and 57 formed integrally therewith for supporting parts of an automatic switching mechanism as will be described. A strip of insulating material 60 is mounted on the posts 54 and 55, and held in position by screws 64 and 66 having lock washers 62 and 68 respectively. Connecting lugs 70 and 72 are riveted to the strip 60 by means of rivets 74 and 76 respectively, which lugs have contacts 78 and 80 respectively mounted thereon. The lugs 70 and 72 have portions 82 and 83, and 84 and 85 formed at their ends for making connections to and for the clamping of suitable conductors 86 and 88 for making connections to the contacts. The rivets 74 and 76 have spacers or collars 90 and 92 respectively formed on their mid-portions so as to space a strip of insulated material 94 away from the strip 60. The strip 94 is held in place against the collars 90 and 92 by riveted heads 96 and 98.

The posts 56 and 57 have mounted thereon a strip of insulating material 100 held in place by means of screws 102 and 104 which have lock washers 106 and 108 respectively. Resilient contact carrying members 110 and 112 are riveted to the strip of insulating material 100 by means of rivets 114 and 116, and 118 and 120 respectively. Suitable connecting lugs 122 and 124 are interposed between the heads of the rivets 116 and 120 and the contact carrying members 110 and 112 respectively to provide means for making suitable connections to the contact carrying members. The contact carrying member 110 has mounted thereon a contact 126 positioned so as to make connection with the contact 78, and the contact carrying member 112 has a contact 128 mounted thereon and positioned so as to make connection with the contact 80. A ring of insulating material 130 having an aperture 132 thru which the shaft 58 freely passes is fastened to the contact carrying members 110 and 112 by means of rivets 134 and 136. Both contact carrying members are normally biased so that they tend to move the contacts 126 and 128 away from the contacts 78 and 80.

A collar 138 is press-fitted on the shaft 58 intermediate the end bell 50 and a motor rotor 51, and has actuating lever supporting members such as 140 and 142 formed thereon. Actuating levers 144 and 146 have lugs such as 148 and 150 formed on their sides that are mounted in apertures such as 152 and 154 in the supporting members 140 and 142 to form a pivotal mounting for the actuating levers 144 and 146 respectively. The actuating levers 144 and 146 have feet 160 and 162, and 156 and 158 respectively that press against the ring 130 when the switch is in the closed position, or when the shaft 58 is stationary or rotating below a predetermined speed. The ends 164 and 166 opposite the feet of the actuating levers 144 and 146 respectively are formed so that they have sufficient mass to act as centrifugal weights. Resilient members 168 and 170 connected at their ends to the actuating levers 144 and 146 urge the levers about their pivotal mountings so that the feet 156, 158, 160, and 162 press against the ring 130 when the shaft is stationary or rotating below the predetermined speed, but permit centrifugal force to overcome their urging force above the predetermined speed and move the feet away from the ring. Pads 172 and 174 made of a suitable cushioning material are fastened to the levers 144 and 146 so as to rest against the shaft 58 when the shaft is stationary, and form stops for the movement of the levers. Pads such as 176 fastened to the collar 138 and made of a suitable cushioning material form stops for the feet 156, 158 and 160 and 162 when the switch is in the running position, and centrifugal force has caused the levers to be moved outward against the urging force of the resilient members 168 and 170.

With particular reference to Fig. 7, parts bearing reference numerals similar to those previously used are similar and perform similar functions. However, in this modification a contact 180 is secured to the strip 94 so as to make connection with a contact 182 that is mounted on a contact carrying member 110 opposite to contact 126. A lug 184 is interposed between the strip 94 and a riveted head 188 of the contact 180 to provide a means for making suitable connections to the contact thru a lead 186. This modification provides the double throw switching action necessary when an even number of condensers is used, and as indicated in Fig. 2.

In the operation of the motor, the switches such as 5 and 7 of Fig. 1 are preferably automatically controlled by centrifugal or electromagnetic means so that when the rotor is stationary the switches are closed. Thus, when the motor is to be started the condensers 4, 6, and 8 are connected in parallel. Then, when a predetermined rotor speed is reached, the switches 5 and 7 open to open the circuit between one side of the condenser 4 and one side of the condenser 6, and the circuit between the other side of the condenser 6 and one side of the condenser 8. This circuit change caused by the operation of the switches causes the condensers to be connected in series. From this it may be seen that below a predetermined rotor speed the parallel connection of the condensers permits their capacities to be directly additive so that a large capacity is effectively in series with the auxiliary field winding for producing a current through that winding that is considerably out of phase with the current in the main field winding 2. It is an important factor of the form shown in Fig. 1, that during the switching, there is no interruption of the current flow to one or more of the motor windings and that the condensers are always in the circuit. In addition, the capacity change occurs without reversal from high to low and up again. These features insure even pull-up torque, reduce sparking at the switch contacts and thus improve the operating characteristics in addition to the other advantages of the system herein set forth.

In Figs. 2 and 3, the two way switch 21 is also preferably centrifugally or electromagnetically controlled so that when the rotor has not reached a predetermined speed, the main field winding 2 is connected to the condenser combination in such a way that the condensers are in a parallel combination; that is, in Fig. 2, to one side of the condenser 11 and one side of the condenser 13 when the switch 12 is closed, and in Fig. 3 to one side of the condenser 14 and one side of the condenser 16 when the switches 15, 17, and 20 are closed. Then, after the predetermined speed is reached, the switch 21 connects the main field 2 to one side of the condenser 11 and one terminal of the switch 12 of Fig. 2 when the switch 12 opens, and to one side of the condenser 14 and one terminal of the switch 15 when the switches 15, 17 and 20 open. It may be noted from this that when an even number of condensers is used an extra switch is required that is not necessary in the case of an odd number of condensers.

The parallel combination of condensers establishes the same voltage across each of the condensers of the parallel combination. After the predetermined rotor speed is reached, and the switches operate to cause the condensers to form a series combination, the capacity of the combination is reduced to a value lower than the capacity of any one of the condensers in the series combination. For instance, if the condensers 4, 6, and 8 have equal capacity, the capacity of the parallel combination will be three times that of one of the condensers, and the capacity of the series combination will be one third that of one of the condensers. At the same time the capacity is reduced by the change from the parallel to the series combination of the condensers, a substantial reduction of voltage across each of the condensers of the combination is affected. For instance, if the capacities of the condensers 4, 6, and 8 are equal, the voltage across each of the condensers when in the series combination will be one third of the voltage across the condensers when in a parallel combination, assuming that the total voltage across the combination stays constant. However, as the rotor speed increases, the flux generated by virtue of the current flowing in the rotor conductors cuts the conductors of the field windings more rapidly, and thus causes an increase in the voltage applied to the combination of condensers.

Since most condensers will safely stand a higher voltage for a short interval of time than for continuous operation, it is a desirable feature that the voltage across each of the condensers be reduced after the rotor is started unless the condensers are built to have a very wide margin of safety. In this way the condenser dielectric may be made lighter without danger of breakdown, or electrolytic condensers may be used since they will stand a higher voltage for a short interval of time than under steady operating conditions.

If under certain operating conditions, it is desirable to make the change in capacity occur gradually, this system lends itself very well to the solution of the problem, because the switches may be so controlled that they will open at different time intervals as the rotor gains speed. Beside this, different numbers of condensers and switches may be used to make the change in capacity occur in whatever steps may be desired. Another feature that lends itself to the flexibility of design is that the size or capacity of the condenser may be so regulated or chosen that for the number of condensers used the ratio of the capacity used for starting to that used for running the motor will be proper to give desirable operating characteristics. That is, for example, if the size of the condensers 11 and 13 in Fig. 2 are properly chosen they may be made to produce the same ratio of capacity for starting to capacity for running that the combination of condensers 4, 6, and 8 in Fig. 1 will produce. It has been found that the ratio of change in capacity has a relation to the size of the motor, and is generally proportional to the ratio of the reactance when running to the reactance at start to obtain the best characteristics for general application. That approximate ratio may be quite easily obtained with uniform or practically uniform change in voltage across each of the condensers of Fig. 1.

In the operation of the switching device shown the parts assume the positions shown in Fig. 4 when the shaft is stationary. That is, the resilient members 168 and 170 urge the feet 156, 158, 160, and 162 against the ring 130 to overcome the biasing of the resilient contact carrying members 110 and 112 and cause the contact 126 to engage the contact 78 and the contact 128 to engage the contact 80. This action closes the switches such as 5 and 7 of Fig. 1 and causes the condensers to be connected in parallel. As the motor starts and gains speed, the ends 164 and 166 of the actuating levers 144 and 146 move outward and away from the shaft against the urging force of the resilient members 168 and 170 by virtue of the centrifugal force due to rotation. The feet 156, 158, 160, and 162 are thus caused to disengage the ring 130 and assume a position such as that shown in Fig. 8. The biasing of the resilient contact carrying members 110 and 112 separates the contacts. The pads such as 176 form a stop and a rest for the feet while they are in the position indicated by Fig. 8.

With the contact arrangement as shown in Fig. 7, the operation is similar except that after the circuit thru the contacts 126 and 78 is broken, a circuit thru the contacts 182 and 180 is closed. This arrangement furnishes the double throw switching operation necessary when an even number of condensers is used as shown in Fig. 2.

From the foregoing description of the construction and the mode of operation of the present system for starting and operating single phase induction motors, it will be apparent that in a preferred form the system comprises chiefly a plurality of single phase induction motor windings 2 and 3; a circuit connecting said windings and including an odd number of condensers 4, 6, and 8 greater than one, and means 5 and 7 for changing the effective reactance of said condensers 4, 6, and 8 by an amount related to the number and size of said condensers 4, 6, and 8, said means 5 and 7, also effecting a change in the voltage across said condensers 4, 6, and 8, said condensers 4, 6, and 8 being operative in the circuit before and after the change.

It is also apparent that the system comprises a plurality of motor windings 2 and 3; a circuit connecting said windings and including a plurality of condensers 4, 6, and 8, or 14, 16, 18, and 19, each having substantially the same capacity, and a switching means 5 and 7, or 15, 17, 20, and 21, only for changing the effective capacity of the plurality of condensers 4, 6, and 8, or 14, 16, 18, and 19, by a ratio greater than 4 to 1 and at the same time the voltage across the condensers 4, 6, and 8, or 14, 16, 18, and 19.

The system herein disclosed possesses the following advantages:

(1) Condenser can be operated for a short period during starting near the voltage rating without damage to the condensers, after which short period the voltage across the condensers is considerably reduced to provide a substantial safety factor.

(2) All of the condensers are used after the motor is started, as well as during starting, to improve the power factor of the motor.

(3) With a system utilizing an odd number of condensers, such as that shown in Figure 1, the switching from the starting to the running circuit is accomplished without opening the circuit to the auxiliary or phase winding.

(4) By varying the number and/or size of the condensers used, different operating characteristics can be obtained to adapt the motor for operation in particular instances.

While the form of embodiment of the present invention as herein disclosed, constitutes a preferred form, it is to be understood that other forms might be adopted, all coming within the scope of the claims which follow.

What is claimed is as follows:

1. A single phase motor circuit comprising in combination, a rotor, a main field winding, an auxiliary field winding, a power supply circuit for each of said windings, a plurality of condensers, a plurality of switches associated with said condensers, means including said switches for effecting a parallel combination of said condenser in series with said auxiliary field winding when the rotor is stationary and for changing the parallel combination of said condensers to a series combination when said rotor reaches a predetermined speed, said means effecting said changes without opening the power supply circuit to the auxiliary winding.

2. In a single phase motor circuit, the combination comprising, a main winding, an auxiliary winding, a plurality of condensers for producing a difference in phase between the currents flowing in said windings, and a switching means only for controlling the effective capacity of said plurality of condensers, said switching means changing the voltage across each of said condensers without effectively removing any of said condensers from the circuit during or after switching.

3. In a single phase motor circuit, the combination comprising, a main winding, an auxiliary winding, an odd number of condensers greater than one for producing a difference in phase between the currents flowing in said windings, switching means for changing the effective capacity of said plurality of condensers by a ratio that is proportional to the reactance when running to the reactance at start and at the same time reducing the voltage across each of said plurality of condensers by an amount dependent upon the number and capacity of the condensers.

4. In an induction motor circuit, the combination comprising, a plurality of windings; a circuit connecting said windings and including a plurality of condensers, a number of condenser circuit control switches equal to one less than the number of condensers, and means including said switches for connecting said condensers in parallel for starting the motor and for changing the connections of said condensers to a series relation as the rotor gains speed without breaking said circuit.

5. In an induction motor circuit, the combination comprising, a plurality of windings; a circuit connecting said windings and including a plurality of condensers each having substantially the same capacity, and a switching means only for changing the effective capacity of said plurality of condensers by a ratio greater than 4 to 1 and at the same time the voltage across said condensers.

6. In an induction motor circuit, the combination comprising, a plurality of windings; a circuit connecting said windings and including an odd number of condensers greater than one, and means for changing the effective reactance of said condensers by an amount related to the number and size of said condensers, said means also effecting a change in the voltage across said condensers, said condensers being operative in the circuit before and after the change.

7. In an induction motor circuit, the combination comprising, a rotor; a plurality of field windings; a power line connected to one end of one of said windings; a second power line connected to the other end of said one winding through an impedance circuit including an odd number of reactances greater than one, reactance control means for changing the effective reactance of said impedance circuit by changing the operative relation of said reactances as the rotor gains speed, each of said reactances being operative in each circuit relation.

8. An induction motor circuit, comprising in combination, a rotor; a main field winding; an auxiliary field winding having one end connected to an end of said main field winding; a power line connected to the common ends of said windings; a second power line connected to the other end of said main field winding; a changeable circuit connected between the second power line and the other end of said auxiliary field winding and including an odd number of condensers greater than one, and means for switching said condensers into a parallel combination when the rotor speed is low and into a series combination when the rotor speed is higher.

9. An induction motor circuit, comprising in combination, a rotor; a main field winding; an auxiliary field winding having one end connected to an end of said main field winding; a power line connected to the common ends of said windings; a second power line connected to the other end of said main field winding; a reactance circuit comprising an odd number of condensers greater than one connected between the second power line and the other end of said auxiliary field winding; said reactance circuit including means for changing the voltage across each of said plurality of condensers for different operating conditions of the motor without interrupting the circuit to the auxiliary winding.

10. In an induction motor circuit, the combination comprising, a plurality of windings; a circuit connecting said windings and including an odd number of condensers greater than one, and a number of condenser circuit control switches equal to one less than the number of condensers, said switches providing means for reducing the voltage across said condensers to a value permitting a substantial safety factor for steady running and in proportion to the number of said condensers.

11. A control circuit for a motor having a rotor, a plurality of field windings, and a power line for supplying energy to the windings comprising, in combination, an odd number of condensers greater than one connected intermediate the power supply line and one of the field windings, said condensers being normally connected in parallel combination by connecting conductors; switches connected in series with alternate connecting conductors, which, when open, change said parallel combination to a series combination to effect a reduction in the capacity of the combination and reduce the voltage across each of the condensers.

12. A control circuit for a motor having a rotor, a plurality of field windings including an auxiliary field winding, and a power line for supplying energy to the windings comprising, in combination, a plurality of condensers connected intermediate the power supply line and the auxiliary field winding, said condensers being normally connected in parallel combination by connecting conductors; switches connected in series with alternate connecting conductors, said switches, when opened, changing the connection of said condensers to a series combination without interrupting the circuit between the power supply line and said auxiliary field winding.

13. A control circuit for a motor having a rotor, a plurality of field windings, and a power supply line for supplying energy to the windings comprising, in combination, a starting circuit comprising a plurality of condensers of substantially equal capacity connected in parallel combination and intermediate the power supply line and one of the windings; a running circuit comprising all of the same condensers actively connected intermediate the power supply line and said winding so that the ratio of the total condenser capacity of the parallel combination to that utilized for the running circuit is greater than 4 to 1; and means for switching between the starting and running circuits.

14. A single phase condenser motor having main and starting primary windings, an odd number of condensers greater than one, said condensers being permanently connected in series relation with the starting winding, and the series circuit thus formed being permanently connected in parallel relation with the main winding, and means for connecting said condensers in parallel in the starting winding circuit for starting the motor.

15. A single phase condenser motor having main and starting windings, an odd number of condensers greater than one, all of equal capacity, said condensers being permanently connected in series relation with the starting winding, and the series circuit thus formed being permanently connected in parallel with the main winding, and means for temporarily connecting said condensers in parallel for starting the motor.

16. A single phase condenser motor having main and starting windings, an odd number of condensers greater than one, said condensers being permanently connected in series relation with the starting winding, and the series circuit thus formed being permanently connected in parallel with the main winding, and additional circuits containing switching means and utilizing said permanent connections for temporarily connecting the condensers in parallel for starting the motor.

17. A single phase condenser motor having main and starting windings, an odd number of condensers greater than one, permanent connections connecting said condensers in series relation with the starting winding, and the series circuit thus formed in parallel with the main winding, and switching means having connections to opposite ends of each condenser and one less number of contact points than the number of condensers and utilizing said permanent connections for temporarily connecting said condensers in parallel for starting the motor.

CALVIN J. WERNER.
EDWARD B. SLEETER.